(12) United States Patent
Attar et al.

(10) Patent No.: US 8,774,208 B2
(45) Date of Patent: Jul. 8, 2014

(54) MANAGEMENT OF TCP/IP MESSAGING IN WIRELESS NETWORKS

(75) Inventors: Rashid Ahmed Akbar Attar, San Diego, CA (US); Christopher Gerard Lott, San Diego, CA (US); Donna Ghosh, San Diego, CA (US); Linhai He, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 13/232,729

(22) Filed: Sep. 14, 2011

(65) Prior Publication Data

US 2013/0064179 A1 Mar. 14, 2013

(51) Int. Cl.
*H04L 12/28* (2006.01)

(52) U.S. Cl.
USPC ............................................................ 370/431

(58) Field of Classification Search
USPC ......... 370/229–231, 252, 328, 329, 400, 401, 370/431, 464, 465, 468
See application file for complete search history.

(56) References Cited

U.S. PATENT DOCUMENTS

| | | | |
|---|---|---|---|
| 6,282,172 B1 | 8/2001 | Robles et al. | |
| 6,415,329 B1 | 7/2002 | Gelman et al. | |
| 7,079,508 B2 * | 7/2006 | Ayyagari et al. | 370/329 |
| 2004/0174870 A1 * | 9/2004 | Viks et al. | 370/358 |
| 2004/0180677 A1 | 9/2004 | Harris et al. | |
| 2005/0102416 A1 | 5/2005 | Miller-Smith | |
| 2007/0091900 A1 | 4/2007 | Asthana et al. | |
| 2007/0291749 A1 | 12/2007 | Taki | |
| 2010/0071055 A1 * | 3/2010 | Kaniz et al. | 726/14 |
| 2010/0115102 A1 | 5/2010 | Kleo | |
| 2010/0254263 A1 * | 10/2010 | Chen et al. | 370/232 |
| 2011/0022812 A1 * | 1/2011 | van der Linden et al. | 711/163 |

FOREIGN PATENT DOCUMENTS

| | | |
|---|---|---|
| EP | 2086187 A1 | 8/2009 |
| WO | 2005112364 A1 | 11/2005 |

OTHER PUBLICATIONS

Border, J., et al., "Performance Enhancing Proxies Intended to Mitigate Link-Related Degradations; draft-ietf-pilc-pep-07.txt", May 3, 2001, vol. pile, No. 7, May 3, 2001, XP015024919, ISSN: 0000-0004.
International Search Report and Written Opinion—PCT/US2012/055536—ISA/EPO—Apr. 24, 2013.

\* cited by examiner

*Primary Examiner* — Kerri Rose
(74) *Attorney, Agent, or Firm* — Jeffrey D. Jacobs

(57) ABSTRACT

Some implementations of the present invention provide mechanisms for gating the transmission of FIN and other short overhead messages of the like in order to improve spectral efficiency. In some implementations spectral efficiency is improved by reducing the number of air-link connections established to merely transmit FIN and other short overhead messages of the like. In one implementation FIN messages are buffered in a queue and transmitted when an air-link connection is established to transmit higher value messages. In one implementation FIN messages are buffered and transmitted when the contents of the buffer breach a threshold that justifies the establishment of an air-link connection to transmit the contents of the buffer.

76 Claims, 12 Drawing Sheets

MANAGEMENT OF TCP/IP MESSAGING IN WIRELESS NETWORKS

BACKGROUND

1. Field

The present application relates to wireless systems, and more specifically to systems, methods and apparatus configured to enable management of wireless network resources.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). In particular, the popularity of high-rate wireless data services is increasing the demand for access to available frequency spectrum. The ability to satisfy the demand is often limited by a lack of available frequency spectrum that may be used for reliable communications within a geographic area.

For services involving multiple processing devices, such as computers, a communication protocol is frequently used to exchange data between devices. Various communication protocols have been standardized over time to allow an application running on a processing device that supports a specific standard to communicate freely with an application running on another processing device supporting the same standard.

The TCP/IP (Transmission Control Protocol/Internet Protocol) suite is generally considered the most common set of communication protocols. Various network layer protocols exist within the TCP/IP suite, some of which accommodate mobility. A protocol that accommodates mobility allows an access terminal to maintain a network layer connection even while it leaves an area serviced by one radio network access gateway to an area serviced by another radio network access gateway.

However, the foundation of the TCP/IP suite was initially designed for wire-line and optical networks, in which available communication channels are not limited to the same extent as they are in wireless networks. As a result there are numerous inefficiencies created by employing the TCP/IP suite in wireless networks.

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to manage air-link connections in combination with client-server application messaging.

One aspect of the disclosure is a method of managing air-link connections. In one implementation the method includes determining whether a data unit is at least one of a first data type and a second data type; and delaying the transmission of data of the first data type until an air-link connection is established for the transmission of data of the second data. In some implementations, the method also includes transmitting data units of the first data type in response to the establishment of an air-link connection.

In some implementations, the second data type has a higher value than the first data type. In some implementations, the second data type includes at least one of time-critical information for an application server and non-overhead information. In some implementations, the first data type includes data that can be delayed without substantially diminishing the user experience. In some implementations, the first type of data is at least one of a FIN packet, a session close, and a socket close command. In some implementations, the first type of data is a packet comprising primarily overhead information.

In some implementations, the method also includes receiving a data unit of the first packet type from an application; storing the data unit in a buffer in order to delay transmission; and transmitting a false acknowledgement to at least one of the application and an operating system in response to receiving the first data unit. In some implementations, the data unit includes a socket close command.

In some implementations, the method also includes sensing the establishment of an air-link connection for the transmission of data units of the second type. In some implementations, the method also includes releasing the data units in the buffer to a radio stack in response to establishing the air-link connection. In some implementations, the method also includes releasing the data units in the buffer to a communication protocol stack in response to establishing the air-link connection. In some implementations, the communication protocol includes at least some elements of the Transmission Control Protocol/Internet Protocol suite.

In some implementations, the method also includes determining that the contents of the buffer has breached a threshold; establishing an air-link connection in response to the breach; and transmitting the data units in the buffer. In some implementations, the method also includes transmitting the data units in the buffer includes releasing the data units in the buffer to a radio stack. In some implementations, the method also includes transmitting the data units in the buffer includes releasing the data units in the buffer to a communication protocol stack.

In some implementations the method also includes receiving a data unit of the first packet type from an application; storing the data unit in a buffer; and transmitting an acknowledgement to at least one of the application and an operating system in response to receiving the first data unit. In some implementations, the acknowledgement includes information intended to bypass a limit on the number of open sockets that can be simultaneously maintained by a device. In some implementations, the limit is policed by at least the operating system.

Another aspect of the disclosure is a computer program product for managing air-link connections that when executed cause an apparatus to determine whether a data unit is at least one of a first data type and a second data type; and delay the transmission of data of the first data type until an air-link connection is established for the transmission of data of the second data.

Another aspect of the disclosure is an apparatus for managing air-link connections. In some implementations, the apparatus includes a controller configured to determine whether a data unit is at least one of a first data type and a second data type, delay the transmission of data of the first data type until an air-link connection is established for the transmission of data of the second data.

Another aspect of the disclosure is an apparatus for managing air-link connections. In some implementations, the apparatus includes means for determining whether a data unit is at least one of a first data type and a second data type; and means for delaying the transmission of data of the first data type until an air-link connection is established for the transmission of data of the second data.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Figure 1:
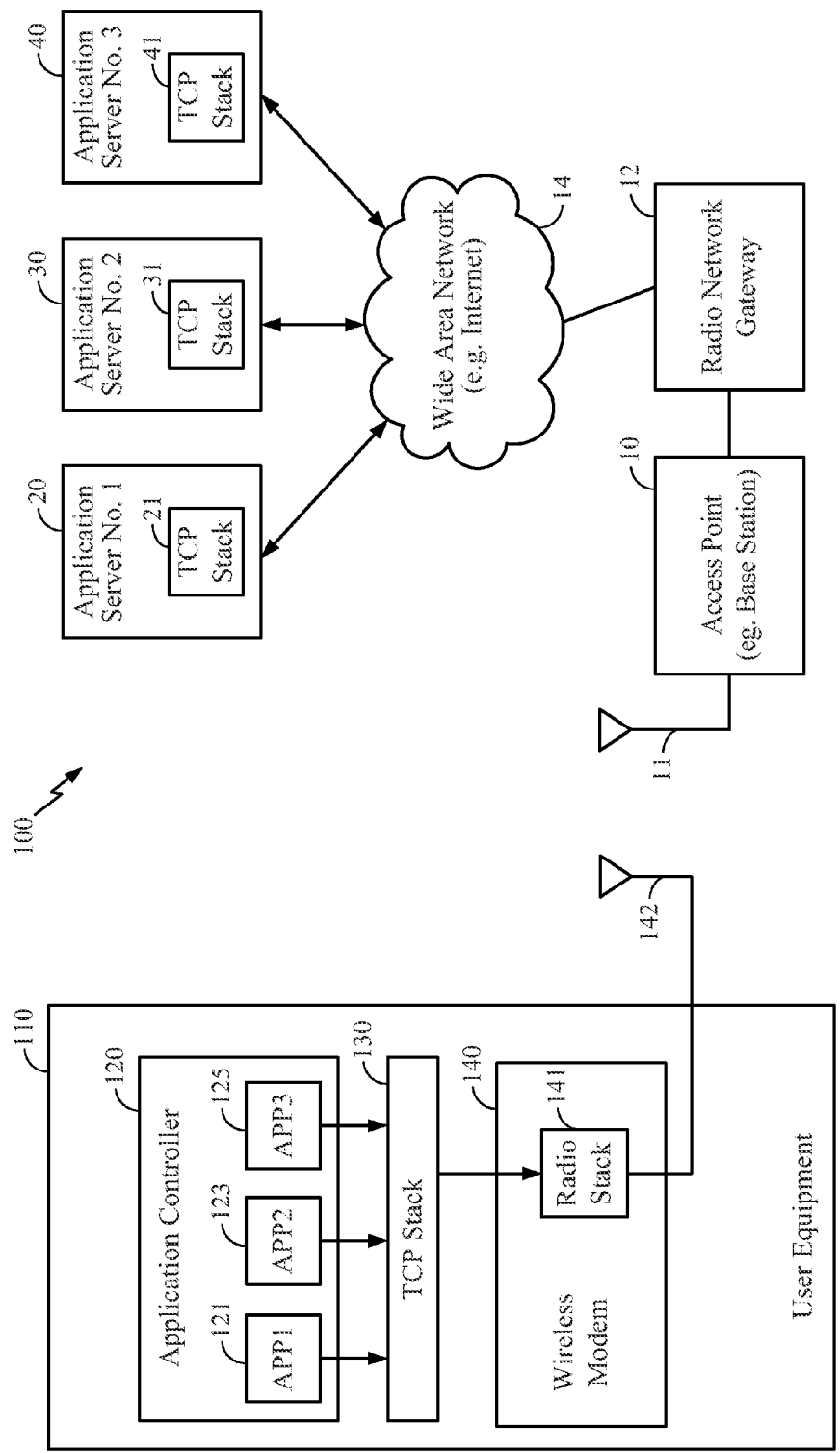
FIG. 1 is a simplified block diagram of a portion of a communication system.

In accordance with common practice the various features illustrated in the drawings may not be drawn to scale. Accordingly, the dimensions of the various features may be arbitrarily expanded or reduced for clarity. In addition, some of the drawings may not depict some of the components of a given system, method or device. Finally, like reference numerals may be used to denote like features throughout the specification and figures.

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal. Moreover, as used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As an AT or UE moves through such a network, the access terminal may be served in certain locations by ANs that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

As noted above, the popularity of high-rate wireless data services is increasing the demand for access to available frequency spectrum. The ability to satisfy the demand is often limited by a lack of available frequency spectrum that may be used for reliable communications within a geographic area. In turn, there lies a challenge to accommodate the increasing demand for spectrum access, and some aspects of implementations disclosed herein may improve the spectral efficiency of wireless networks used to deliver data services.

In a variety of wireless networks, to alleviate demand for channel access, the available traffic channels in a particular segment of frequency spectrum are shared by multiple users. For example, in one implementation an access terminal negotiates an air-link connection (i.e. access to a traffic channel) with serving access point when the access terminal has data to transmit. In order to enable channel access sharing, many wireless networks employ dormancy timers that are used to terminate a respective air-link connection to a particular access terminal that has been dormant for at least the duration of the timer (e.g. 2 seconds). The timers enable sharing of traffic channels among many access terminals by re-assigning channel access at least when a particular access terminal with an established air-link connection fails to make use of the air-link connection.

However, the processes for establishing and managing air-link connections between a mobile device and a base station are distinctly different from the processes provided by TCP/IP for data communication between processing devices. The foundation of the TCP/IP suite was initially designed for wire-line and optical networks, in which available communication channels are not limited to the same extent as they are in wireless networks. As such, there are number of problems associated with TCP/IP complaint messaging over wireless networks, and there are numerous inefficiencies created by employing the TCP/IP suite in wireless networks. In particular, the TCP/IP suite often mandates the transmission of various types of overhead messages to enable robust communications between a client and a server.

FIG. 1 is a simplified block diagram of a portion of an example communication system 100. The system 100 includes an access terminal 110, an access point 10, a radio access gateway 12, a wide area network 14, and first, second and third application servers 20, 30, 40. Those skilled in the art will appreciate that a communication system may typically include fewer, more and/or different components than are illustrated in FIG. 1, and that FIG. 1 merely includes components more pertinent to aspects of implementations disclosed herein.

For example, while three application servers 20, 30, 40 have been illustrated in FIG. 1, those skilled in the art will appreciate that a communication system may include any number of application servers, including no application servers at all. Each application server 20, 30, 40 includes a respective TCP stack 21, 31, 41. The functions of each TCP stack 21, 31, 41 may be performed by a suitable combination of software, hardware and/or firmware running on each application server 20, 30, 40, respectively. The wide area network 14 may include a public network, a private network, a portion of the internet and/or any combination thereof. The radio access gateway 12 and the access point 10 may be included in a wireless network, the remainder of which has not been illustrated for the sake of brevity. The access point 10 also includes an antenna 11.

The access terminal 110 includes an application controller 120, a TCP stack 130 and a wireless modem 140. The wireless modem 140 includes a radio stack 141 and is connectable to an antenna 142. Those skilled in the art will appreciate that the functional blocks included in the access terminal 110 may be each implemented by a suitable combination of software, hardware and/or firmware. Moreover, those skilled in the art will appreciate that an access terminal may include fewer or more components than are illustrated in FIG. 1, and that the access terminal 110 of FIG. 1 merely includes components more pertinent to aspects of implementations disclosed herein.

In operation the application controller 120 is generally employed to control and/or monitor applications running on the access terminal 110. For example, first, second and third applications 121, 123 and 125 are illustrated as running within the purview of the application controller 120. Each of the first, second and third applications 121, 123, 125 is a client-side application of a respective one of the first, second and third application servers 20, 30, 40.

TCP/IP uses a client-server model of communication in which a client computer requests and is provided a service, such as the content of a website, by a server. For example, the first application 121 may be a web-browser that is requesting information from the first application server 20. In order to facilitate communication between a client and a server, both the client and server establish respective sockets. The respective client and server sockets are referred to as socket pairs. Each socket pair is typically described by a unique 5-tuple struct consisting of a protocol ID, source and destination IP addresses and source and destination port numbers.

A connection between a client and a server is terminated by closing the respective client-side and server-side sockets. The termination relies on a handshake mechanism with each side of the connection terminating independently. When an endpoint wishes to terminate a respective half of the connection, the endpoint transmits a TCP-FIN (FIN) packet, which the other endpoint acknowledges with an ACK. In accordance with this procedure, a typical tear-down of a client-server connection requires a pair of FIN and ACK packets from each TCP endpoint.

At the client device (e.g. the access terminal 110 in FIG. 1) the termination of a connection to a server can be initiated by software application (e.g. a browser or the first application 121 of FIG. 1). For example, with reference to FIG. 1, the first application 121 generates a socket close command, which is provided to the TCP stack 130 of the access terminal 110. The client TCP 130 stack then generates a FIN message that is transmitted to the server TCP stack 21 of the application server 20. This procedure, which leads to the ad hoc transmission of FIN messages from client devices, is not considered a significant source of network congestion in wire-line and optical networks, because channel bandwidth is not generally considered a particularly scarce resource in wire-line and optical networks.

Additionally, an access terminal 110 may establish multiple TCP/IP connections with one or more servers that communicate with the access terminal 110 through a respective access point 10, with which the access terminal 110 can establish an air-link connection. The air link connection is typically closed if there is no data transmission for a period of time. Each time an application running on the access terminal 110 operates to terminate a TCP/IP connection a FIN message is generated by the TCP stack 130 on the access terminal 110. The FIN message is passed to the radio stack 141 of the wireless modem 140, which causes the wireless modem 140 to establish an air-link connection to the access point 10 in order to transmit the FIN message. Those skilled in the art will appreciate that the access terminal 110 and the access point 10 access the wireless traffic channel via the respective antenna 142 and 10.

In many instances an air-link connection is setup merely to transmit a FIN message. The ad hoc transmission of FIN and other short overhead messages from access terminals may lead to increased network traffic, and in turn, reduce the spectral efficiency of the wireless network as a whole. A FIN message (or the like) is typically very short and does not typically provide time-critical information to the server. In turn, the amount of overhead that is created to transmit just a FIN message reduces the spectral efficiency of a wireless network, which in turn reduces overall network capacity. Additionally, to the extent that such overhead messages merely add negligible improvements in performance, if at all, the ad hoc transmission of such messages reduces battery life of mobile access terminals, which deteriorates the user experience. So while TCP/IP provides a robust communication protocol for wire-line and optical networks, TCP/IP does not always satisfy the unique demands of modern wireless networks.

Some implementations of the present invention provide mechanisms for gating the transmission of FIN and other short overhead messages in order to improve spectral efficiency. In some implementations spectral efficiency is improved by reducing the number of air-link connections established to merely transmit FIN and other short overhead messages. In one implementation FIN messages are buffered in a queue and transmitted when an air-link connection is established to transmit higher value messages. In one implementation FIN messages are buffered and transmitted when the contents of the buffer breach a threshold that justifies the establishment of an air-link connection to transmit the contents of the buffer. In some implementations, the methods disclosed herein may be adapted to gate any type of session-close message that may be asynchronously generated.

In one implementation a first method is provided for managing FIN messages generated in response to socket close commands from applications running on a mobile device. The method includes receiving a socket close command. The method optionally includes providing an acknowledgement to the application. The method includes generating a FIN message. The method includes buffering the FIN message in a queue. The method also includes delaying the transmission of one or more FIN messages in the queue until an air-link connection is established for higher value communication.

In one implementation a second method is provided for managing socket-close messages generated by software applications running on a mobile device. The method includes buffering a socket close command from a software application in a queue. The method includes providing a false acknowledgement back to the software application running locally within the device. The method includes delaying the processing of one or more buffered socket close commands until an air-link connection is established for higher value communication.

Figure 2:
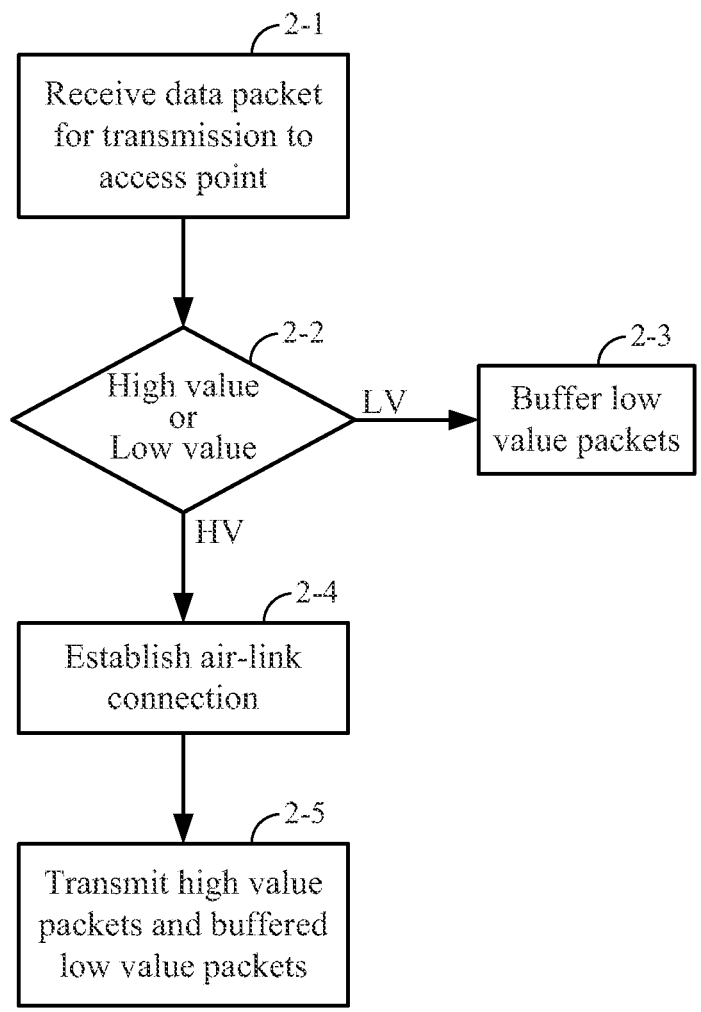
FIG. 2 is a flowchart of an implementation of a method.

FIG. 2 is a flowchart of an implementation of a method. In some implementations, the method is performed by a suitable combination of software, hardware and/or firmware included in an access terminal. As represented by block 2-1, the method includes receiving a data packet (or a data unit or the like) from an application for transmission to an access point. As represented by block 2-2, the method includes determining whether the packet is a high value packet or a low value packet. A high value packet may be, for example, a packet that provides time-critical information that has an impact on user experience and/or a packet that provides non-overhead information to the application server. In contrast, a low value packet may be, for example, a packet that does not provide time-critical information to a corresponding application server, and can thus be delayed without substantially diminishing the user experience. For example, low value packets include FIN packets and in some implementations GET messages for advertisements.

With further reference to block 2-2, if the packet is a low value packet (LV path from 2-2), as represented by block 2-3, the method includes buffering low value packets for transmission at a later time before proceeding to the portion of the method represented by block 2-1. In other words, an air-link connection is not established for the sole purpose of transmitting a low value packet. If the packet is a high value packet (HV path from 2-2), as represented by block 2-4, the method includes establishing an air-link connection with the serving access point. As represented by 2-5, the method includes transmitting the high value packets and any buffered low value packets.

Figure 3:
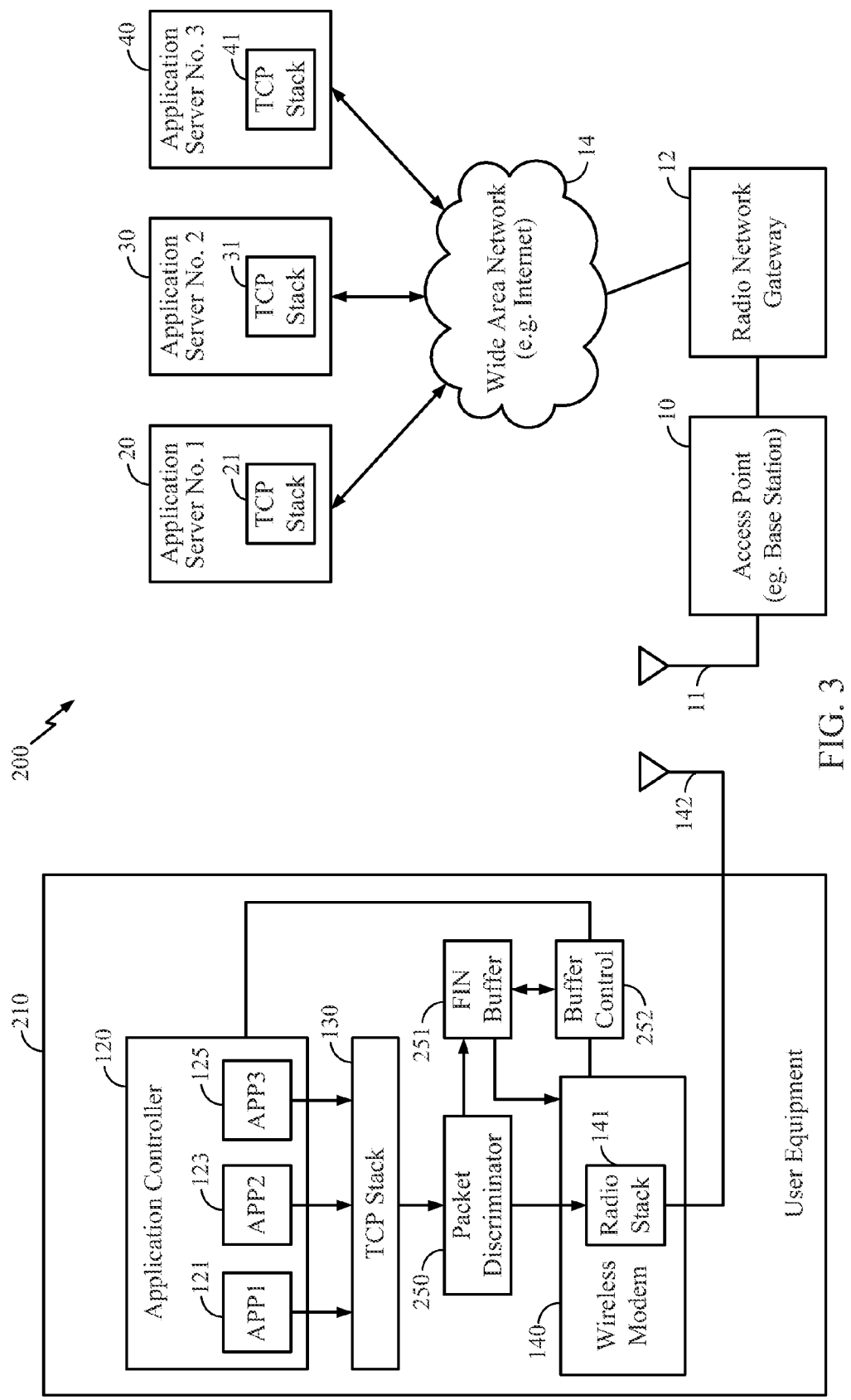
FIG. 3 is a simplified block diagram of a portion of a communication system including an example implementation of a modified access terminal.

FIG. 3 is a simplified block diagram of a portion of a communication system 200 including an example implementation of an access terminal 210. The communication system 200 illustrated in FIG. 3 is similar to and adapted from the communication system 100 illustrated in FIG. 1. Elements common to both share common reference indicia, and only differences between the systems 100, 200 are described herein for the sake of brevity.

In particular, the access terminal 210 of FIG. 3 is configured to reduce the number of ad hoc transmissions of FIN and other short overhead messages of the like. To that end, the access terminal 210 includes a packet discriminator module 250, a FIN buffer 251 and a buffer control module 252. Those skilled in the art will appreciate that the functions of the packet discriminator module 250, the FIN buffer 251 and the buffer control module 252 can be performed by a suitable combination of software, hardware and/or firmware running on the access terminal 210, and that the functions have been grouped in the aforementioned functional blocks for the sake of conveniently describing aspects of a particular implementation. Moreover, while a FIN buffer is shown in FIG. 3, those skilled in the art will appreciate from the disclosure herein that the FIN buffer can be employed to buffer any number of low value packets for transmission at a later time. In other words, in various implementations the FIN buffer is provided to enable gating the transmission of FIN and other short overhead messages of the like in order to improve spectral efficiency without substantially diminishing the user experience.

The packet discriminator 250 is connectable to receive packets from the TCP stack 130. The packet discriminator 250 provides outputs to the FIN buffer 251 and the radio stack 141 of the wireless modem 140. The FIN buffer 251 is also connectable to provide packets to the radio stack 141 of the wireless modem 140. The buffer control module 252 is connectable to receive signals from the wireless modem 140 and the application controller 120. The buffer control module 252 is also connectable to provide a control signal to the FIN buffer 251.

In operation, the TCP stack 130 receives data units from one or more applications 121, 122, 123. In turn, the TCP stack 130 generates packets, which are passed to the packet discriminator 250. As described above, the packet discriminator 250 determines whether packets are low value overhead packets or higher value packets. Higher value packets are passed onto the radio stack 141 of the wireless modem 140, which in turn establishes an air-link connection to the access point 10. However, low value overhead packets, such as FIN packets and the like, are initially buffered in the FIN buffer 251 in order to prevent establishing an air-link connection merely for the transmission of FIN packets and the like.

The FIN buffer 251 is flushed and FIN messages are transmitted when the air-link connection is established for the transmission of higher value packets, and/or as a result of packets sent from the network. To that end, the buffer control 252 senses when the wireless modem 140 establishes an air-link connection and provides a control signal to the FIN buffer 251. The control signal causes the FIN buffer 251 to release any buffered packets to the radio stack 141.

Figure 4:
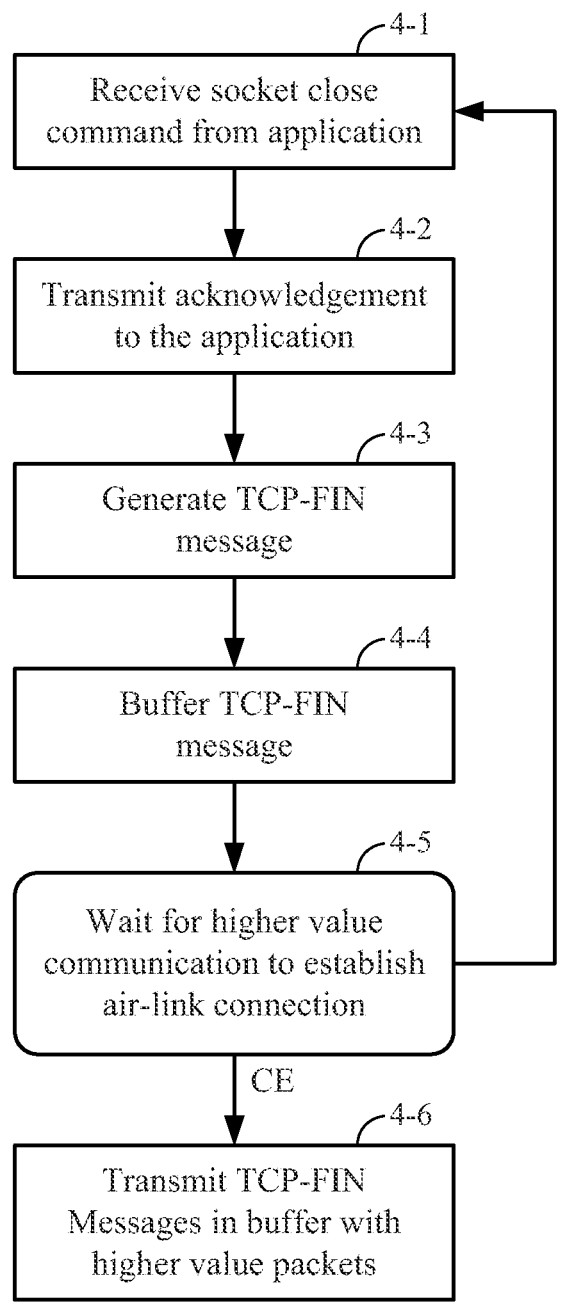
FIG. 4 is a flowchart of an implementation of a method.

FIG. 4 is a flowchart of an implementation of a method. In some implementations, the method is performed by a suitable combination of software, hardware and/or firmware included in an access terminal. As represented by block 4-1, the method includes receiving a socket close command from an application. As represented by block 4-2, the method includes transmitting an acknowledgement to the application. As represented by block 4-3, the method includes generating a FIN message in response to receiving the FIN. As represented by block 4-4, the method includes buffering the FIN message for transmission at a later time. As represented by block 4-5, the method includes waiting for a higher value packet(s) and/or after receiving packets from the network before establishing an air-link connection. When a high value packet is received an air-link connection to an access point is established (CE path from 4-5). In turn, as represented by block 4-6, the method includes transmitting the buffered FIN messages along with the higher value packet(s). Alternatively, if a socket close command is received while waiting from a higher value packer (SC path from 4-5), the method include proceeding to the portion of the method represented by block 4-1.

Figure 5:
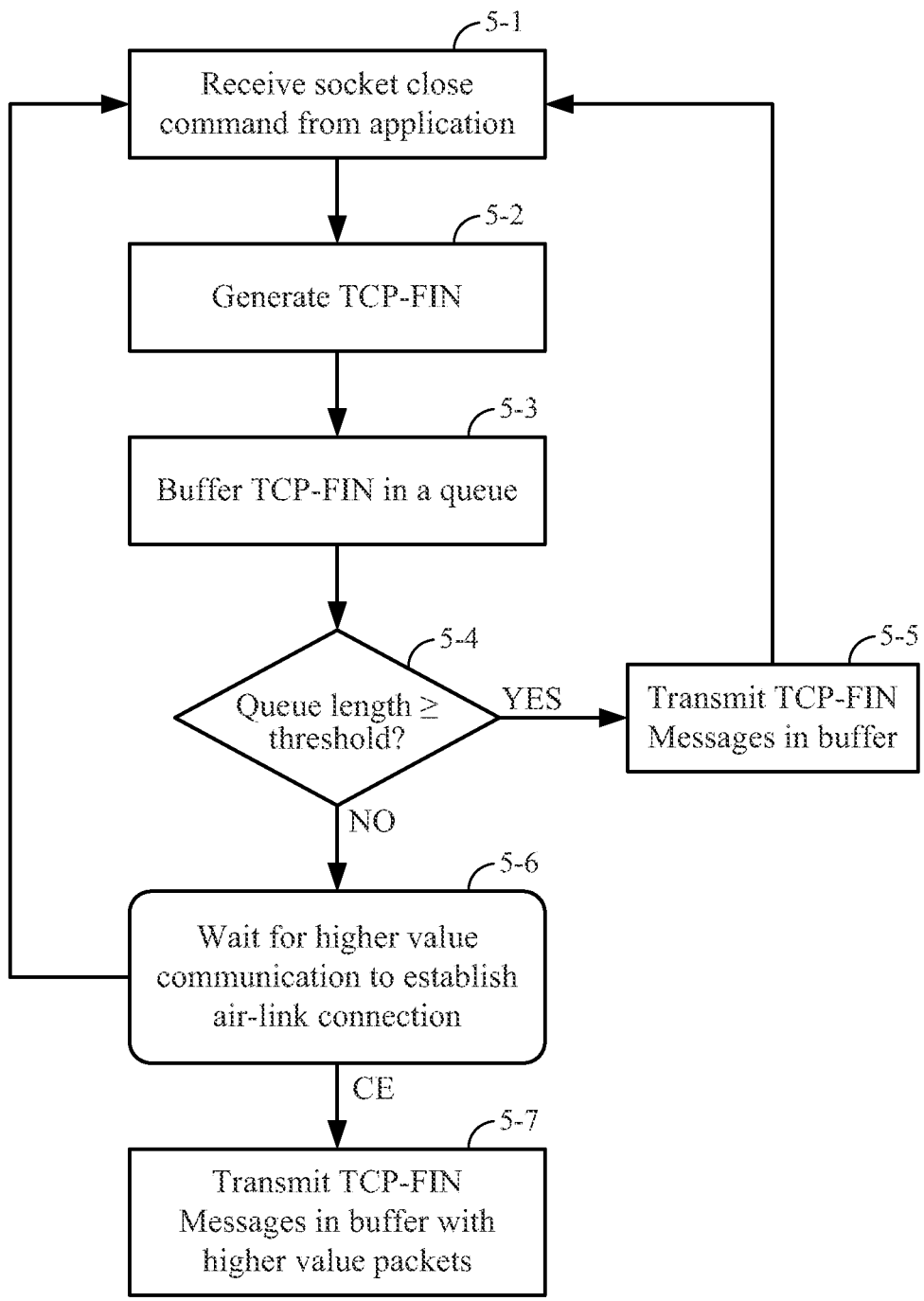
FIG. 5 is a flowchart of an implementation of a method.

FIG. 5 is a flowchart of an implementation of a method. In some implementations, the method is performed by a suitable combination of software, hardware and/or firmware included in an access terminal. As represented by block 5-1, the method includes receiving a socket close command from an application. As represented by block 5-2, the method includes generating a FIN message in response to receiving the FIN. As represented by block 5-3, the method includes buffering the FIN message for transmission at a later time.

As represented by block 5-4, the method includes determining if the number of buffered FIN messages (and the like) exceeds a threshold. For example, the threshold may be approximately equal to the duration of a dormancy timer that causes the re-assignment of a traffic channel. As such, if the number of buffered messages exceeds the duration of the dormancy timer, it may be worthwhile to establish an air-link connection to flush the buffer. That is, given a particular threshold number of buffered messages, the time needed to transmit the contents of the buffer is longer than the dormancy buffer. In turn, the air-link connection is unlikely to have significant idle time, which may reduce spectral efficiency. With further reference to block 5-4, if the number of buffered messages is greater than the threshold (Yes path from 5-4), as represented by block 5-5, the method includes transmitting the buffered overhead messages. On the other hand, if the number of buffered messages is less than the threshold (No path from 5-4), as represented by block 5-5, the method includes waiting for a higher value packet(s) before establishing an air-link connection. When a high value packet is received an air-link connection to an access point is established (CE path from 5-6). In turn, as represented by block 5-7, the method includes transmitting the buffered FIN messages along with the higher value packet(s). Alternatively, if a new socket close command is received while waiting from a higher value packer (SC path from 5-6), the method include proceeding to the portion of the method represented by block 5-1.

Figure 6:
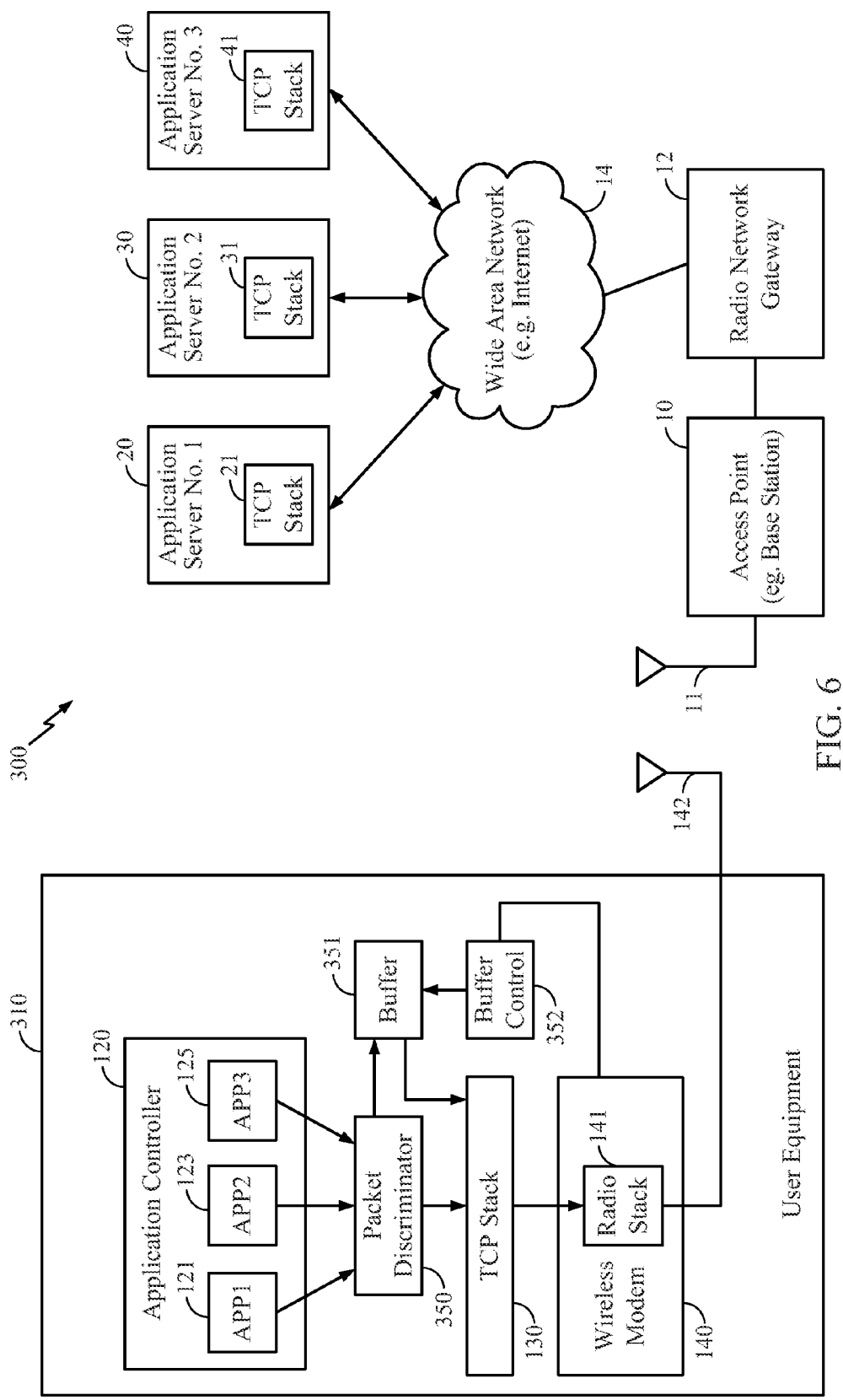
FIG. 6 is a simplified block diagram of a portion of a communication system including another example implementation of a modified access terminal.

FIG. 6 is a simplified block diagram of a portion of a communication system including another example implementation of an access terminal. The communication system 300 illustrated in FIG. 6 is similar to and adapted from the communication system 100 illustrated in FIG. 1. Elements common to both share common reference indicia, and only differences between the systems 100, 300 are described herein for the sake of brevity.

In particular, the access terminal 310 of FIG. 6 is configured reduce the number of ad hoc transmissions of FIN and other short overhead messages of the like. To that end, the access terminal 310 includes a discriminator module 350, a buffer 351 and a buffer control module 352. Those skilled in the art will appreciate that the functions of the discriminator module 350, the buffer 351 and the buffer control module 352 can be performed by a suitable combination of software, hardware and/or firmware running on the access terminal 310, and that the functions have been grouped in the aforementioned functional blocks for the sake of conveniently describing aspects of a particular implementation. In various implementations the buffer 351 is provided to enable gating the transmission of short overhead messages of the like in order to improve spectral efficiency.

The discriminator 350 is connectable to receive data units from applications that are typically within the purview of the application controller 120. The discriminator 350 provides outputs to the buffer 351 and the TCP stack 130. The buffer 351 is also connectable to provide packets to the TCP stack 130. The buffer control module 352 is connectable to receive signals from the wireless modem 140. The buffer control module 352 is also connectable to provide a control signal to the buffer 351.

In operation, the discriminator 350 receives data units from one or more applications 121, 122, 123. As described below with reference to FIG. 7, the discriminator 350 determines whether the data unit is a socket close command and/or another type of data unit likely to cause the TCP stack 130 to generate a low value overhead message. Other types of data units are transferred to the TCP stack 130, which in turn produces packets. The packets are provided to the radio stack 141 of the wireless modem 140, which establishes an air-link connection to the access point 10. In other words, in the implementation described with reference to FIG. 6, data units that lead to the creation of low value overhead messages are buffered. When higher value data units are ready from transmission the contents of the buffer are passed to the TCP stack 130. In turn, the TCP stack 130 generates the low value overhead packets to be transmitted by the wireless modem 140 along with the higher value packets. To that end, the buffer control 352 senses when the wireless modem 140 establishes an air-link connection and provides a control signal to the buffer 351. The control signal causes the buffer 351 to release any buffered data units to the TCP stack 130.

Figure 7:
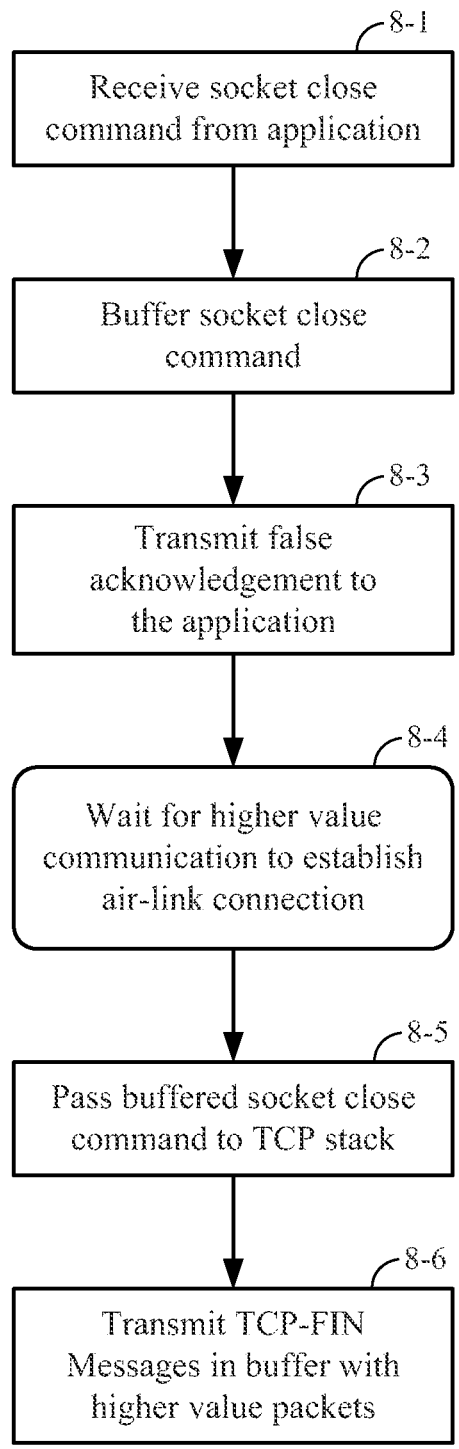
FIG. 7 is a flowchart of an implementation of a method.

FIG. 7 is a flowchart of an implementation of a method. In some implementations, the method is performed by a suitable combination of software, hardware and/or firmware included in an access terminal. As represented by block 7-1, the method includes receiving a socket close command (or the like) from an application. As represented by block 7-2, the method includes buffering the socket close command. As represented by block 7-3, the method optionally includes transmitting a false acknowledgement command to the application and/or the operating system. Transmitting a false acknowledgement command to the application and/or the operating system may be beneficial in systems where the allowable number of open sockets is limited. For example, some versions of the Android operating system limit the number of sockets that can be open at the same time for one access terminal. Accordingly, providing a false acknowledgement bypasses the limit by misleading the operating system and/or the application that polices the limit.

As represented by block 7-4, the method includes waiting for a higher value data units from one or more applications before establishing an air-link connection. When a high value data unit is received (HV path from 7-4), as represented by block 7-5, the method includes passing the contents of the buffer to the TCP stack, which in turn produces corresponding low value packets, such as FIN and/or other low value overhead messages. The low value packets are passed to the wireless modem. In turn, as represented by block 7-6, the method includes transmitting the low value packets along with the higher value packet(s).

Figure 8:
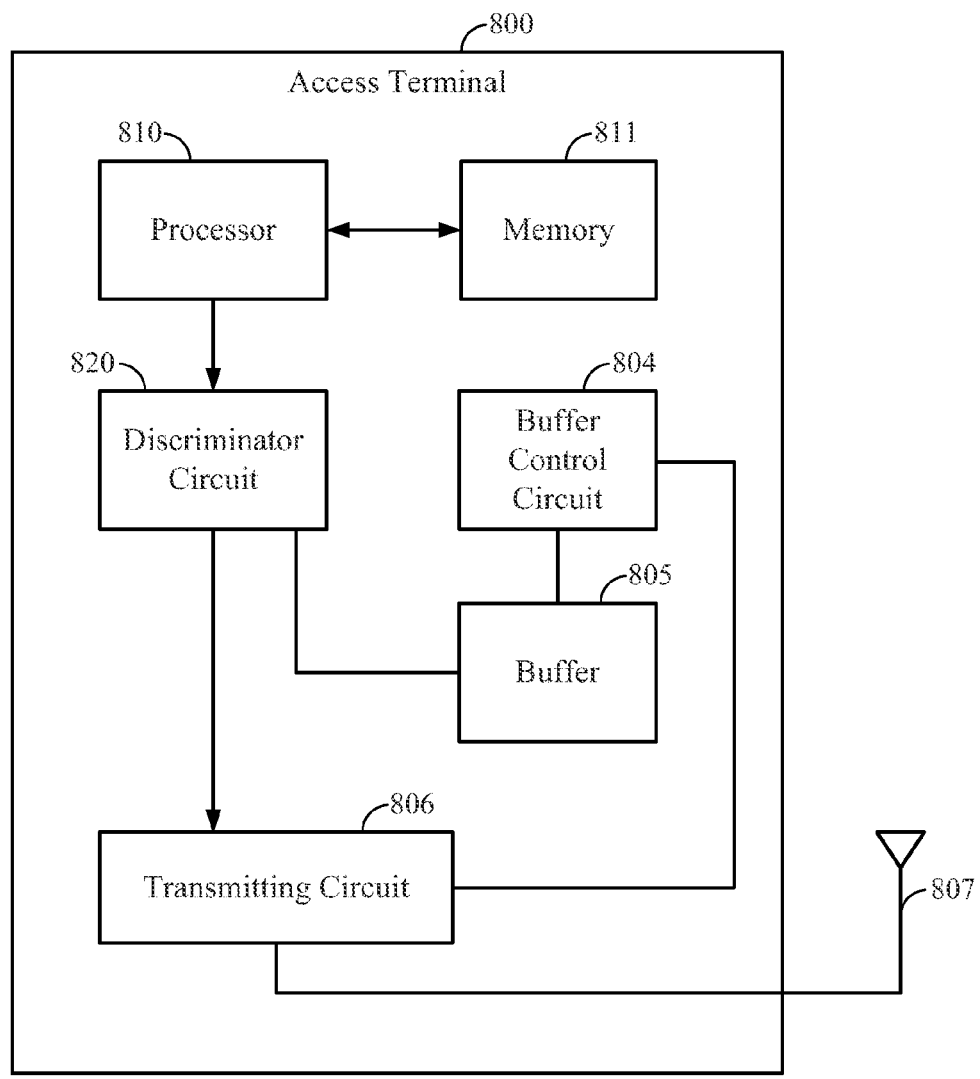
FIG. 8 is a block diagram of an example access terminal in accordance with certain aspects of the present disclosure.

FIG. 8 is a block diagram of a of an example access terminal 800 in accordance with certain aspects of the present disclosure. Those skilled in the art will appreciate that an access terminal may have more components than the access terminal 800 illustrated in FIG. 8. The access terminal 800 includes only those components useful for describing some prominent features of implementations within the scope of the claims. The access terminal 800 includes a processor 801, a memory 802, a discriminating circuit 803, a buffer control circuit 804, a buffer 805, a transmitting circuit 806 and an antenna 807. In one implementation the processor 801 is configured process computer program code of one or more applications stored in the memory. In one implementation, means for processing includes a processor. In one implementation, a storage means includes a memory. In one implementation, the discriminator circuit 803 is configured to determine whether a data unit or a packet is a high value or low value data unit and/or a packet. In one implementation, means for discriminating includes a discriminator circuit. In one implementation, the buffer control circuit 804 is configured to determine when to allow the contents of the buffer 805 to be available for transmission. In one implementation, means for controlling includes a buffer control circuit. In one implementation, means for buffering includes a buffer. In one implementation, the transmitting circuit 806 is configured to transmit packets to an access point via the antenna 807. In one implementation, means for transmitting includes a transmitter circuit.

Figure 9:
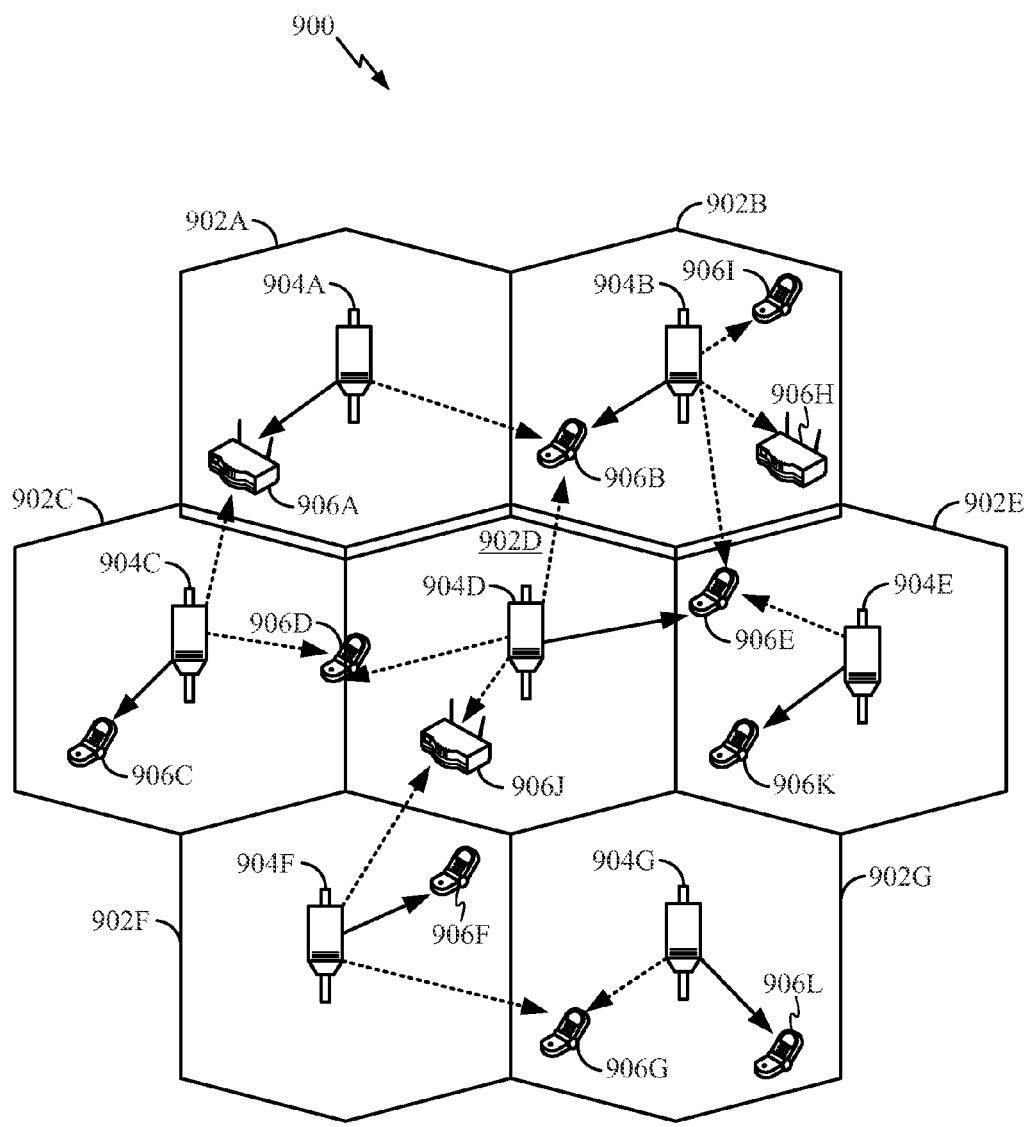
FIG. 9 is a simplified diagram of a wireless communication system.

FIG. 9 is a simplified diagram of a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). Access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a densely populated urban neighborhood or several miles in rural environment.

Figure 10:
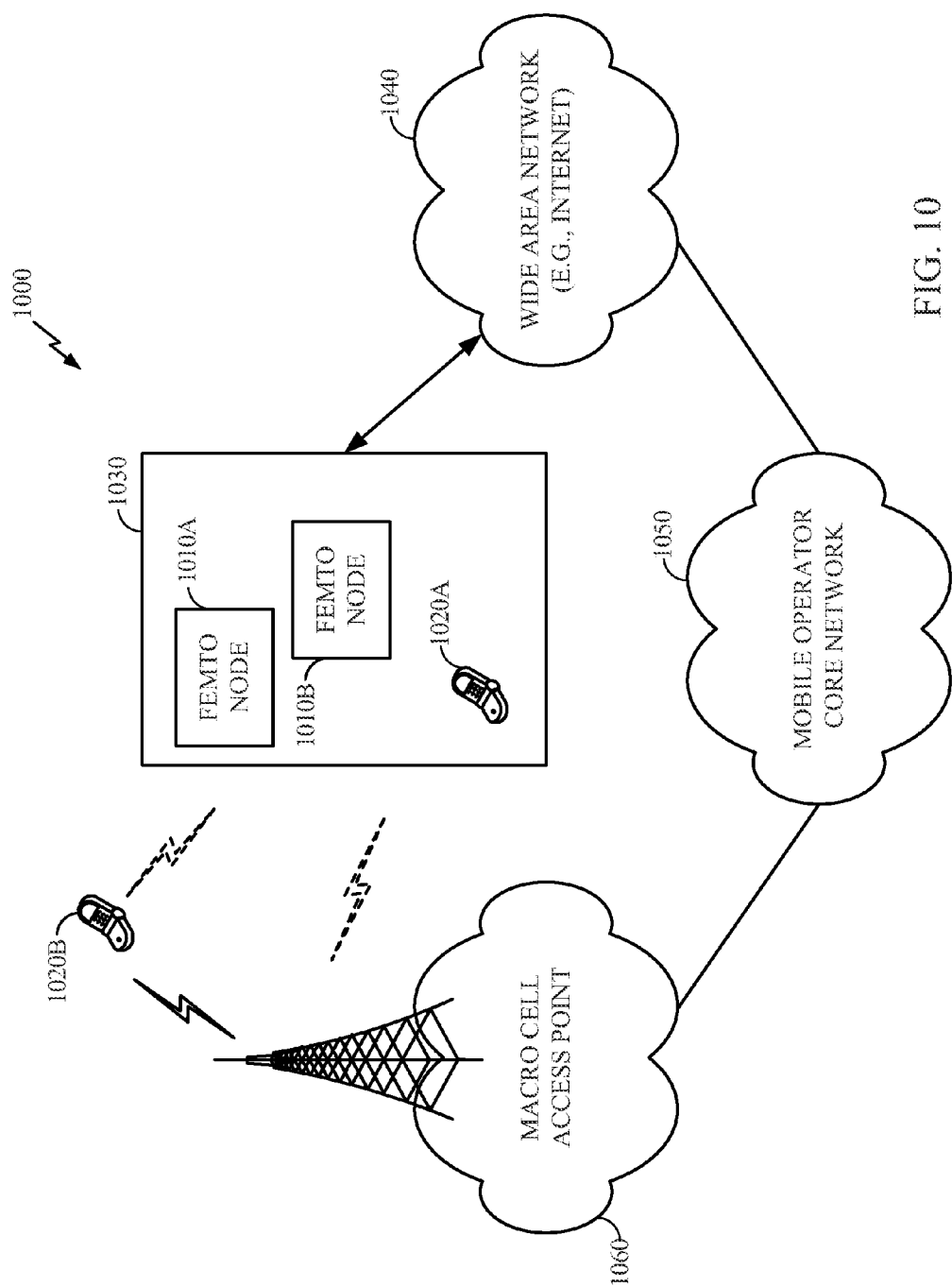
FIG. 10 is a simplified diagram of a wireless communication system including femto nodes.

FIG. 10 is a simplified diagram of an example communication system 1000 where one or more femto nodes are deployed within a network environment. Specifically, the system 1000 includes multiple femto nodes 1010 (e.g., femto nodes 1010A and 1010B) installed in a relatively small scale network environment (e.g., in one or more user residences 1030). Each femto node 1010 may be coupled to a wide area network 1040 (e.g., the Internet) and a mobile operator core network 1050 via a DSL router, a cable modem, a wireless link, or other connectivity means (not shown). As will be discussed below, each femto node 1010 may be configured to serve associated access terminals 1020 (e.g., access terminal 1020A) and, optionally, alien access terminals 1020 (e.g., access terminal 1020B). In other words, access to femto nodes 1010 may be restricted whereby a given access terminal 1020 may be served by a set of designated (e.g., home) femto node(s) 1010 but may not be served by any non-designated femto nodes 1010 (e.g., a neighbor's femto node 1010).

Figure 11:
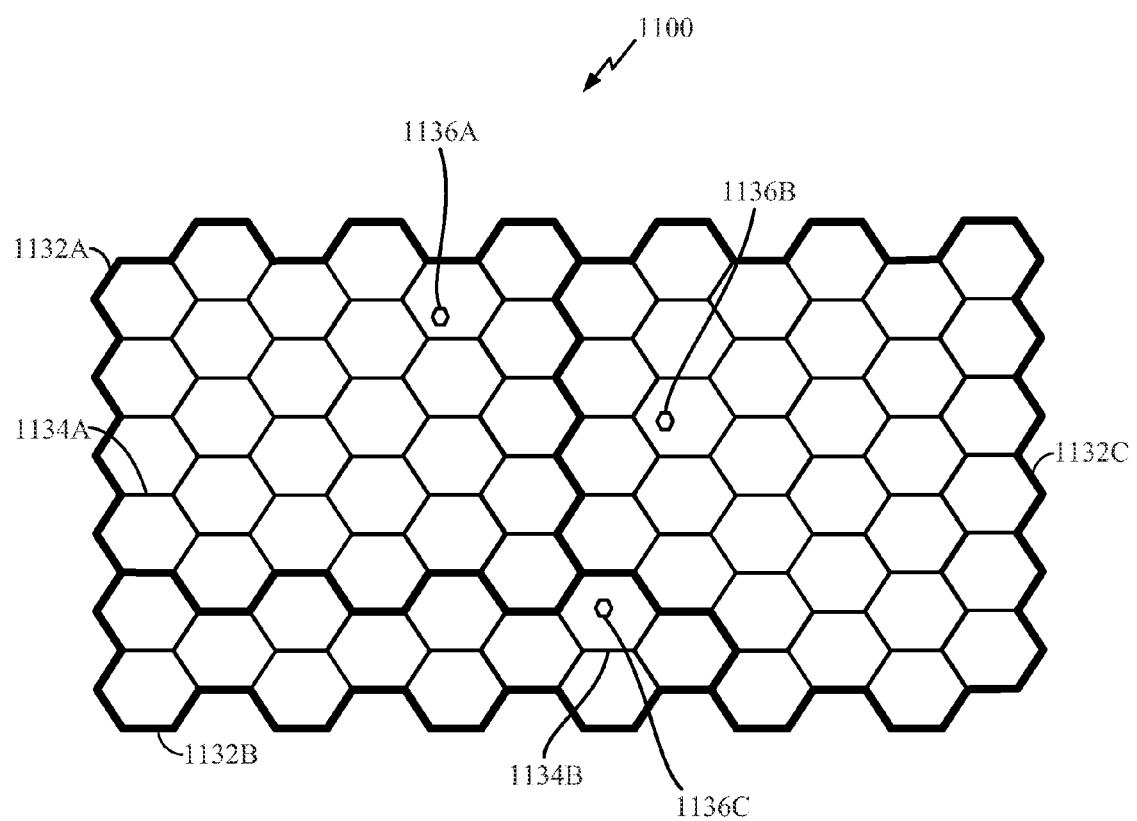
FIG. 11 is a simplified diagram illustrating coverage areas for wireless communication.

FIG. 11 is a simplified diagram illustrating an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the hexagons. The tracking areas 1102 also include femto coverage areas 1106. In this example, each of the femto coverage areas 1106 (e.g., femto coverage area 1106C) is depicted within a macro coverage area 1104 (e.g., macro coverage area 1104B). It should be appreciated, however, that a femto coverage area 1106 may not lie entirely within a macro coverage area 1104. In practice, a large number of femto coverage areas 1106 may be defined with a given tracking area 1102 or macro coverage area 1104. Also, one or more pico coverage areas (not shown) may be defined within a given tracking area 1102 or macro coverage area 1104.

Referring again to FIG. 10, the owner of a femto node 1010 may subscribe to mobile service, such as, for example, 3G and/or 4G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of femto nodes 1010 (e.g., the femto nodes 1010A and 1010B that reside within a corresponding user residence 1030). For example, when a subscriber is outside his home, he is served by a standard macro access point (e.g., access point 1060) and when the subscriber is at home, he is served by a femto node (e.g., node 1010A). Here, it should be appreciated that a femto node 1010 may be backward compatible with existing access terminals 1020.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1010 that reside within the corresponding user residence 1030). In some implementations, a node may be restricted to not provide, for at least one node, at least one of: signaling, data access, registration, paging, or service.

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
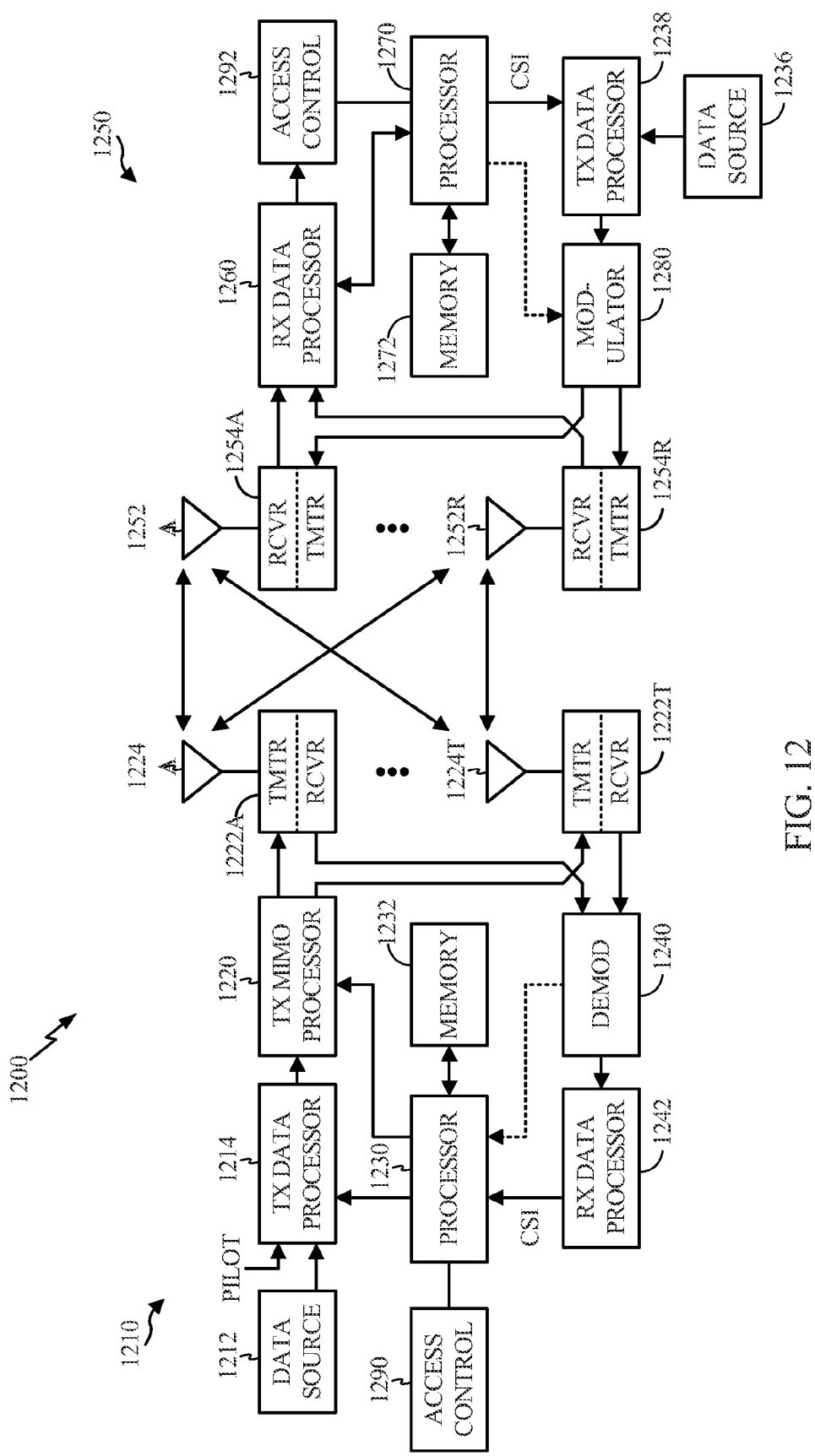
FIG. 12 is a simplified block diagram of several sample aspects of communication components.

The teachings herein may be incorporated into a node (e.g., a device) employing various components for communicating with at least one other node. FIG. 12 depicts several sample components that may be employed to facilitate communication between nodes. Specifically, FIG. 12 is a simplified block diagram of a first wireless device 1210 (e.g., an access point) and a second wireless device 1250 (e.g., an access terminal) of a MIMO system 1200. At the first device 1210, traffic data for a number of data streams is provided from a data source 1212 to a transmit (TX) data processor 1214.

In some aspects, each data stream is transmitted over a respective transmit antenna. The TX data processor 1214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the second device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the second device 1250.

The reverse link message may comprise various types of information regarding the communication link and/or the received data stream. The reverse link message is then processed by a TX data processor 1238, which also receives traffic data for a number of data streams from a data source

1236, modulated by a modulator 1280, conditioned by the transceivers 1254A through 1254R, and transmitted back to the device 1210.

At the device 1210, the modulated signals from the second device 1250 are received by the antennas 1224, conditioned by the transceivers 1222, demodulated by a demodulator (DEMOD) 1240, and processed by a RX data processor 1242 to extract the reverse link message transmitted by the second device 1250. The processor 1230 then determines which precoding matrix to use for determining the beam-forming weights then processes the extracted message.

FIG. 12 also illustrates that the communication components may include one or more components that perform access control operations as taught herein. For example, an access control component 1290 may cooperate with the processor 1230 and/or other components of the device 1210 to send/receive signals to/from another device (e.g., device 1250) as taught herein. Similarly, an access control component 1292 may cooperate with the processor 1270 and/or other components of the device 1250 to send/receive signals to/from another device (e.g., device 1210). It should be appreciated that for each device 1210 and 1250 the functionality of two or more of the described components may be provided by a single component. For example, a single processing component may provide the functionality of the access control component 1290 and the processor 1230 and a single processing component may provide the functionality of the access control component 1292 and the processor 1270.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method comprising:
    determining whether a data unit is at least one of a first data type and a second data type;
    delaying the transmission of data of the first data type to prevent establishing an air-link connection to transmit data of the first data type;
    establishing an air-link connection for the transmission of data of the second data type in response to determining that the data unit is of the second data type; and
    transmitting the delayed data of the first data type over the air-link connection for data of the second data type, the transmitting the delayed data triggered by the determining that the data unit is of the second data type.

2. The method of claim 1, wherein the second data type has a higher value than the first data type.

3. The method of claim 1, wherein the second data type includes at least one of time-critical information for an application server and non-overhead information.

4. The method of claim 1, wherein the first data type includes data that can be delayed without substantially diminishing the user experience.

5. The method of claim 4, wherein the first type of data is at least one of a FIN packet, a session close, and a socket close command.

6. The method of claim 4, wherein the first type of data is a packet comprising primarily overhead information.

7. The method of claim 1, further comprising:
    receiving a data unit of the first data type from an application;
    storing the data unit in a buffer in order to delay transmission; and
    transmitting a false acknowledgement to at least one of the application and an operating system in response to receiving the first data unit.

8. The method of claim 7, wherein the data unit includes a socket close command.

9. The method of claim 7, further comprising sensing the establishment of an air-link connection for the transmission of data units of the second type.

10. The method of claim 9, further comprising releasing the data units in the buffer to a radio stack in response to establishing the air-link connection.

11. The method of claim 9, further comprising releasing the data units in the buffer to a communication protocol stack in response to establishing the air-link connection.

12. The method of claim 11, wherein the communication protocol includes at least some elements of the Transmission Control Protocol/Internet Protocol suite.

13. The method of claim 7, further comprising:
    determining that the contents of the buffer has breached a threshold;
    establishing an air-link connection in response to the breach; and
    transmitting the data units in the buffer.

14. The method of claim 13, wherein transmitting the data units in the buffer includes releasing the data units in the buffer to a radio stack.

15. The method of claim 13, wherein transmitting the data units in the buffer includes releasing the data units in the buffer to a communication protocol stack.

16. The method of claim 1, further comprising:
  receiving a data unit of the first data type from an application;
  storing the data unit in a buffer; and
  transmitting an acknowledgement to at least one of the application and an operating system in response to receiving the first data unit.

17. The method of claim 16, wherein the acknowledgement includes information intended to bypass a limit on the number of open sockets that can be simultaneously maintained by a device.

18. The method of claim 17, wherein the limit is policed by at least the operating system.

19. The method of claim 1, further comprising transmitting data units of the first data type in response to the establishment of an air-link connection.

20. A computer program product stored in memory, for managing air-link connections that when executed by a processor cause an apparatus to:
  determine whether a data unit is at least one of a first data type and a second data type; and
  delay the transmission of data of the first data type to prevent establishing an air-link connection to transmit data of the first data type;
  establish an air-link connection for the transmission of data of the second data type in response to determining that the data unit is of the second data type;
  transmit the delayed data of the first data type over the air-link connection for data of the second data type, the transmitting the delayed data triggered by the determining that the data unit is of the second data type.

21. The computer program product of claim 20, wherein the second data type has a higher value than the first data type.

22. The computer program product of claim 20, wherein the second data type includes at least one of time-critical information for an application server and non-overhead information.

23. The computer program product of claim 20, wherein the first data type includes data that can be delayed without substantially diminishing the user experience.

24. The computer program product of claim 23, wherein the first type of data is at least one of a FIN packet, a session close, and a socket close command.

25. The computer program product of claim 23, wherein the first type of data is a packet comprising primarily overhead information.

26. The computer program product of claim 20, further comprising instructions that when executed cause an apparatus to:
  receive a data unit of the first data type from an application;
  store the data unit in a buffer in order to delay transmission; and
  transmit a false acknowledgement to at least one of the application and an operating system in response to receiving the first data unit.

27. The computer program product of claim 26, wherein the data unit includes a socket close command.

28. The computer program product of claim 26, further comprising instructions that when executed cause an apparatus to sense the establishment of an air-link connection for the transmission of data units of the second type.

29. The computer program product of claim 26, further comprising instructions that when executed cause an apparatus to release the data units in the buffer to a radio stack in response to establishing the air-link connection.

30. The computer program product of claim 28, further comprising instructions that when executed cause an apparatus to release the data units in the buffer to a communication protocol stack in response to establishing the air-link connection.

31. The computer program product of claim 30, wherein the communication protocol includes at least some elements of the Transmission Control Protocol/Internet Protocol suite.

32. The computer program product of claim 26, further comprising instructions that when executed cause an apparatus to:
  determine that the contents of the buffer has breached a threshold;
  establish an air-link connection in response to the breach; and
  transmit the data units in the buffer.

33. The computer program product of claim 32, wherein transmitting the data units in the buffer includes releasing the data units in the buffer to a radio stack.

34. The computer program product of claim 32, wherein transmitting the data units in the buffer includes releasing the data units in the buffer to a communication protocol stack.

35. The computer program product of claim 20, further comprising instructions that when executed cause an apparatus to:
  receive a data unit of the first data type from an application;
  store the data unit in a buffer; and
  transmit an acknowledgement to at least one of the application and an operating system in response to receiving the first data unit.

36. The computer program product of claim 35, wherein the acknowledgement includes information intended to bypass a limit on the number of open sockets that can be simultaneously maintained by a device.

37. The computer program product of claim 36, wherein the limit is policed by at least the operating system.

38. The computer program product of claim 20, further comprising instructions that when executed cause an apparatus to transmit data units of the first data type in response to the establishment of an air-link connection.

39. An apparatus comprising:
  means for determining whether a data unit is at least one of a first data type and a second data type; and
  means for delaying the transmission of data of the first data type to prevent establishing an air-link connection to transmit data of the first data type;
  means for establishing an air-link connection for the transmission of data of the second data type in response to determining that the data unit is of the second data type;
  means for transmitting the delayed data of the first data type over the air-link connection for data of the second data type, the transmitting the delayed data triggered by the determining that the data unit is of the second data type.

40. The apparatus of claim 39, wherein the second data type has a higher value than the first data type.

41. The apparatus of claim 39, wherein the second data type includes at least one of time-critical information for an application server and non-overhead information.

42. The apparatus of claim 39, wherein the first data type includes data that can be delayed without substantially diminishing the user experience.

43. The apparatus of claim 42, wherein the first type of data is at least one of a FIN packet, a session close, and a socket close command.

44. The apparatus of claim 42, wherein the first type of data is a packet comprising primarily overhead information.

45. The apparatus of claim 39, further comprising:
  means for receiving a data unit of the first data type from an application;
  means for storing the data unit in a buffer in order to delay transmission; and
  means for transmitting a false acknowledgement to at least one of the application and an operating system in response to receiving the first data unit.

46. The apparatus of claim 45, wherein the data unit includes a socket close command.

47. The apparatus of claim 45, further comprising means for sensing the establishment of an air-link connection for the transmission of data units of the second type.

48. The apparatus of claim 45, further comprising means for releasing the data units in the buffer to a radio stack in response to establishing the air-link connection.

49. The apparatus of claim 47, further comprising means for releasing the data units in the buffer to a communication protocol stack in response to establishing the air-link connection.

50. The apparatus of claim 49, wherein the communication protocol includes at least some elements of the Transmission Control Protocol/Internet Protocol suite.

51. The apparatus of claim 45, further comprising:
  means for determining that the contents of the buffer has breached a threshold;
  means for establishing an air-link connection in response to the breach; and
  means for transmitting the data units in the buffer.

52. The apparatus of claim 51, wherein transmitting the data units in the buffer includes releasing the data units in the buffer to a radio stack.

53. The apparatus of claim 51, wherein transmitting the data units in the buffer includes releasing the data units in the buffer to a communication protocol stack.

54. The apparatus of claim 39, further comprising:
  means for receiving a data unit of the first data type from an application;
  means for storing the data unit in a buffer; and
  means for transmitting an acknowledgement to at least one of the application and an operating system in response to receiving the first data unit.

55. The apparatus of claim 54, wherein the acknowledgement includes information intended to bypass a limit on the number of open sockets that can be simultaneously maintained by a device.

56. The apparatus of claim 55, wherein the limit is policed by at least the operating system.

57. The apparatus of claim 38, further comprising means for transmitting data units of the first data type in response to the establishment of an air-link connection.

58. An apparatus comprising:
  a controller configured to:
    determine whether a data unit is at least one of a first data type and a second data type;
    delay the transmission of data of the first data type to prevent establishing an air-link connection to transmit data of the first data type;
    establish an air-link connection for the transmission of data of the second data type in response to determining that the data unit is of the second data type; and
    transmit the delayed data of the first data type over the air-link connection for data of the second data type, the transmitting the delayed data triggered by the determining that the data unit is of the second data type.

59. The apparatus of claim 58, wherein the second data type has a higher value than the first data type.

60. The apparatus of claim 58, wherein the second data type includes at least one of time-critical information for an application server and non-overhead information.

61. The apparatus of claim 58, wherein the first data type includes data that can be delayed without substantially diminishing the user experience.

62. The apparatus of claim 61, wherein the first type of data is at least one of a FIN packet, a session close, and a socket close command.

63. The apparatus of claim 61, wherein the first type of data is a packet comprising primarily overhead information.

64. The apparatus of claim 58, wherein the controller is further configured to:
  receive a data unit of the first data type from an application;
  store the data unit in a buffer in order to delay transmission; and
  transmit a false acknowledgement to at least one of the application and an operating system in response to receiving the first data unit.

65. The apparatus of claim 64, wherein the data unit includes a socket close command.

66. The apparatus of claim 64, wherein the controller is further configured to sense the establishment of an air-link connection for the transmission of data units of the second type.

67. The apparatus of claim 64, wherein the controller is further configured to release the data units in the buffer to a radio stack in response to establishing the air-link connection.

68. The apparatus of claim 66, wherein the controller is further configured to release the data units in the buffer to a communication protocol stack in response to establishing the air-link connection.

69. The apparatus of claim 68, wherein the communication protocol includes at least some elements of the Transmission Control Protocol/Internet Protocol suite.

70. The apparatus of claim 64, wherein the controller is further configured to:
  determine that the contents of the buffer has breached a threshold;
  establish an air-link connection in response to the breach; and
  transmit the data units in the buffer.

71. The apparatus of claim 70, wherein transmitting the data units in the buffer includes releasing the data units in the buffer to a radio stack.

72. The apparatus of claim 70, wherein transmitting the data units in the buffer includes releasing the data units in the buffer to a communication protocol stack.

73. The apparatus of claim 58, wherein the controller is further configured to:
  receive a data unit of the first data type from an application;
  store the data unit in a buffer; and
  transmit an acknowledgement to at least one of the application and an operating system in response to receiving the first data unit.

74. The apparatus of claim 73, wherein the acknowledgement includes information intended to bypass a limit on the number of open sockets that can be simultaneously maintained by a device.

75. The apparatus of claim 74, wherein the limit is policed by at least the operating system.

76. The apparatus of claim 58, wherein the controller is further configured to transmit data units of the first data type in response to the establishment of an air-link connection.

* * * * *